March 28, 1950          J. M. HUDSON          2,502,152
EMERGENCY BRAKE SYSTEM
Filed Aug. 12, 1947          2 Sheets-Sheet 1
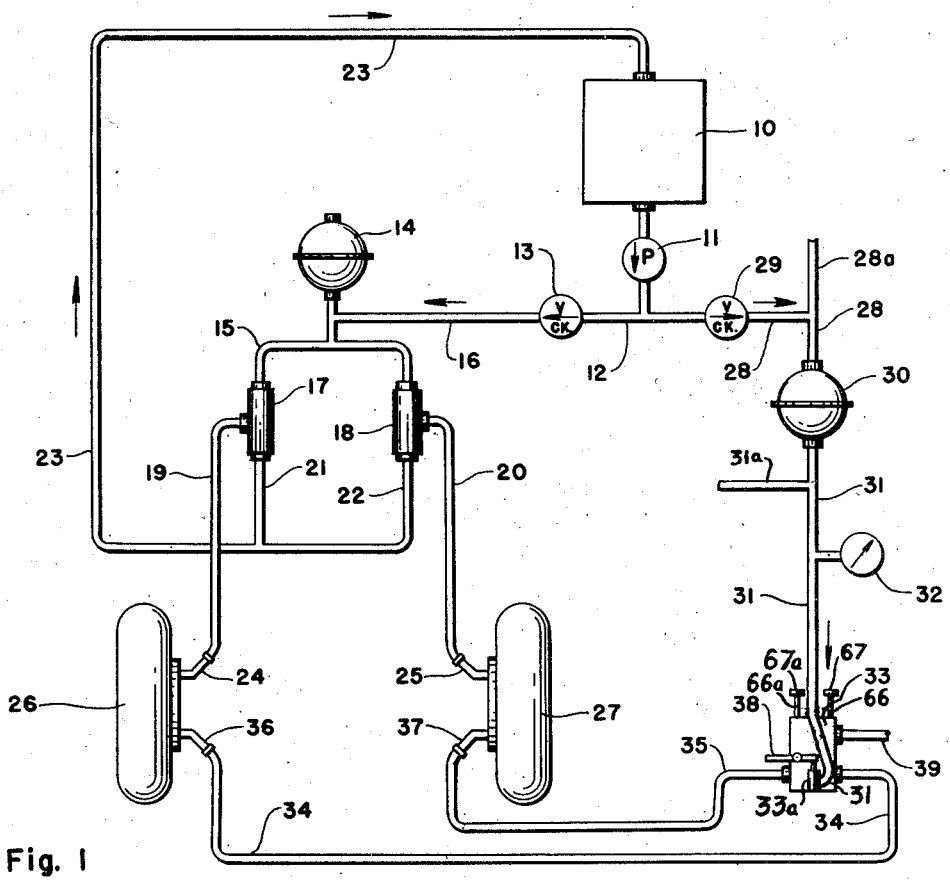
Fig. 1
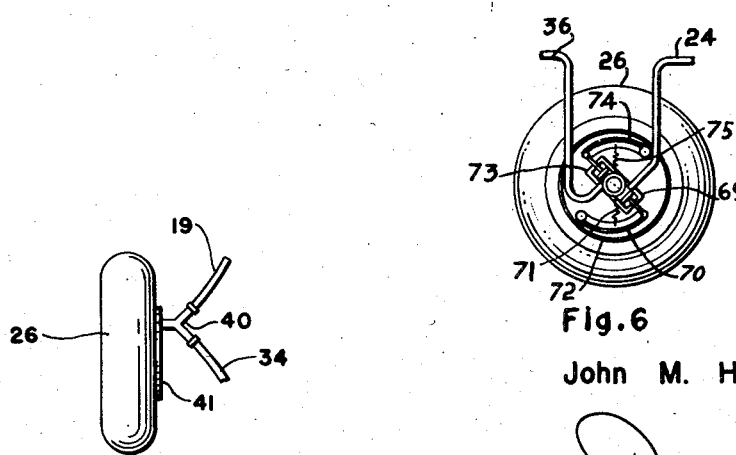
Fig. 2
Fig. 6
John M. Hudson
    *INVENTOR.*
BY
HIS PATENT ATTORNEY March 28, 1950

J. M. HUDSON 2,502,152

EMERGENCY BRAKE SYSTEM

Filed Aug. 12, 1947

John M. Hudson
*INVENTOR.*

BY James M. Clark
HIS PATENT ATTORNEY

Patented Mar. 28, 1950

2,502,152

UNITED STATES PATENT OFFICE 2,502,152

EMERGENCY BRAKE SYSTEM

John M. Hudson, San Diego, Calif., assignor to Consolidated Vultee Aircraft Corporation, a corporation of Delaware Application August 12, 1947, Serial No. 768,165

11 Claims. (Cl. 188—152)

The present invention relates to braking systems and more particularly to improvements in emergency braking systems for the wheels of aircraft and other vehicles movable along the ground.

It is the customary practice in most wheeled vehicles of various types to provide alternate braking means for use in the event of an emergency. These emergency braking mechanisms are frequently separate and independent from the normal brake mechanism in order that failure of the latter will not affect the emergency mechanism. In most prior brake systems, however, the application of the emergency brake has usually necessitated the use of entirely separate control members requiring a different operating technique than the normal brake control members. These prior emergency systems have been inadequate for the most part due to their added weight, delayed actuation and complicated mechanism and have been particularly ineffective where the operations require differential braking of the wheels and simultaneous control of the rudder of the craft.

The present invention represents an improvement in these respects over prior known braking systems in several important aspects. Initially, the operation of the emergency portion of the braking system is automatically provided for by development of emergency pressure by the normal operation of the main fluid system. It further provides for the immediate conditioning of the emergency parts of the system by the simple operation of a single emergency release lever. A further distinguishing feature of the present invention is the fact that the emergency portion of the system can be operated differentially in the same manner as the normal portion of the system; and also that the emergency operation is conducted from the same set of rudder pedals or controls as the normal operation.

The improved system comprises essentially normal hydraulic and emergency air or pneumatic brake portions in one form of the invention by connecting the brake operating pedals to both the normal hydraulic brake valve and to an air emergency brake valve means. An emergency accumulator is installed in a branch line, preferably on the pump or pressure side of the normal brake system accumulator, the said branch line leading from the air chamber of the emergency accumulator to the air emergency brake valve. This arrangement is such that upon actuation of an emergency release lever the air under pressure in this branch line will be permitted to enter the air brake valve chambers, being distributed through emergency lines to the brake operating units of the respective wheel brakes.

It is accordingly a primary object of the present invention to provide an improved emergency braking system utilizing both hydraulic and pneumatic pressure means. A further object is the provision of a brake system in which the operation of the normal hydraulic or main system automatically develops pneumatic pressure which is available for emergency braking operations. A further object of the present invention resides in the provision of a simple unitary means for the rapid conditioning of the emergency part of the system, in the form of a single readily accessible emergency release lever or pedal. It is a still further object of the invention to provide in such systems an emergency pneumatic system portion which can be operated differentially with respect to the several wheels in a similar manner as the normal hydraulic braking system. A further and corollary object resides in the provision for the operation of the emergency pneumatic portion of the system from the same set of rudder pedals or control members as in the case of the normal hydraulic operation of the brakes.

Other objects and advantages of the present invention will become apparent to those skilled in the art after reading the present description taken together with the accompanying drawings, forming a part hereof, in which:

Figure 1 is a diagrammatic view of a preferred form of a combined normal hydraulic and emergency pneumatic braking system as applied to a pair of wheels;

Figure 2 is a similar view of a modified wheel having a single unitary brake adapted for both hydraulic and pneumatic actuation;

Figure 6 is an elevational view of one of the wheels shown in Figure 1, illustrating the separate brake motors for braking this wheel.

Figure 3:
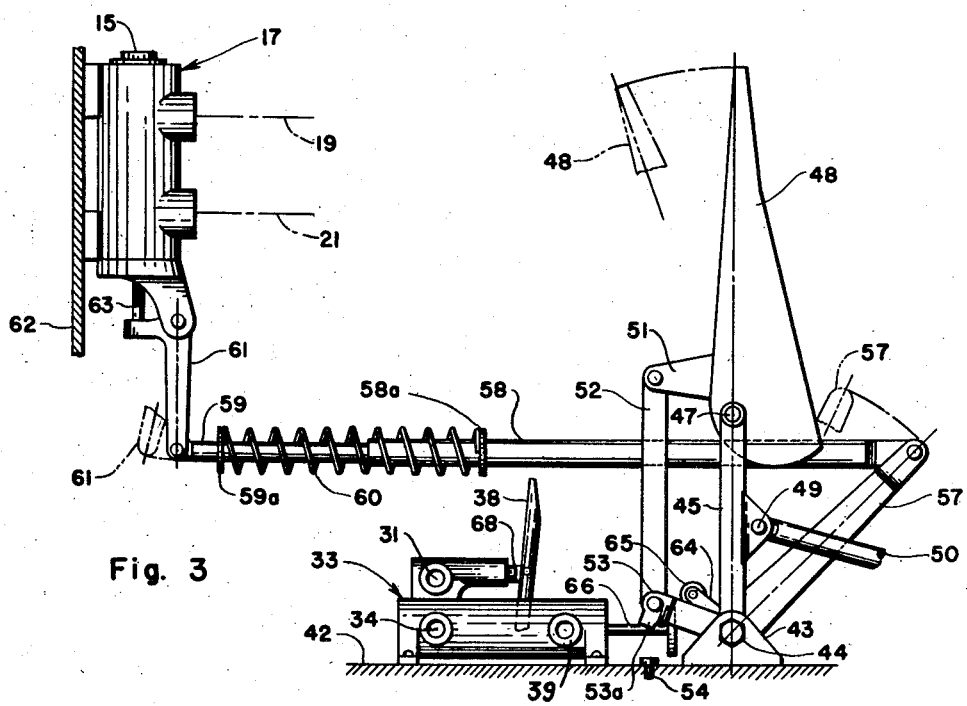
Figure 3 is a side elevational view of a typical portion of the actuating mechanism for the control and operation of the combined brake system shown in Figure 1.

Referring now to Figure 1, the numeral 10 represents a storage tank or reservoir for oil or other hydraulic fluid to be used in the brake system. A pressure pump 11 draws this hydraulic fluid from the reservoir 10, discharging the same under suitably high operating pressures into the main pressure line 12 through the check valve 13 into the further main pressure line 16. A pair of pressure branches or conduits 15 communicate with the main pressure line 16 to which there is also connected the main hydraulic accumulator 14. The latter preferably is air filled in the upper space above its bladder or diaphragm, and operates in a conventional and well known manner in the normal hydraulic operating portion of the system. The pressure branches 15 conduct the fluid to the hydraulic power brake valves 17 and 18, which are of the differential type in order that individual actuation of the brake pedals or other control members causes similar differential braking of the wheels 26 and 27. The brake valves 17 and 18 are preferably identical and are of a conventional and well known construction which will be hereinafter more fully described in conjunction with the actuating mechanism and the operation of the combined system. The brake valves 17 and 18 are provided with ports which communicate through the brake cylinder lines 19 and 20 and the connections 24 and 25, with the hydraulic actuating cylinders of the wheels 26 and 27, respectively. The brake valves 17 and 18 are also provided with return ports in communication with the return conduits 21 and 22, which in turn communicate with the main return conduit 23. The latter conducts hydraulic fluid under certain conditions, such as when the wheel brakes are released, to the reservoir 10, from which it is subsequently drawn by the pump 11.

The emergency pneumatic portion of the brake system is arranged for by the provision of an emergency conduit 28 open to the main pressure line 12 on the discharge side of the pressure pump 11. The fluid pressure entering the emergency line 28 passes through a check valve 29, similar to the check valve 13 in the normal hydraulic pressure line, and passes from the emergency hydraulic conduit 28 into the upper chamber of an emergency hydraulic-pneumatic accumulator 30. The lower, or opposite, chamber of this accumulator, on the other side of its bladder or diaphragm, is open to the pneumatic conduit 31, having an air pressure gauge 32 operatively connected thereto, and extends down to the air emergency differential brake valve 33. This valve is also of conventional construction and is provided with outlets in communication with emergency conduits 34 and 35 which are connected to the fittings 36 and 37 on the pneumatic brake units of the wheels 26 and 27, respectively. The emergency air brake valve 33 is provided with a release lever 38 which when actuated permits air pressure from the accumulator 30 to enter both chambers of the brake valve in order to permit the differential or simultaneous braking of the wheels 26 and 27 by pneumatic pressure in the event of an emergency. The air brake valve 33 is also provided with an air exhaust outlet in communication with the conduit 39 through which air is relieved when the emergency brakes are released. An air charging line 31a is provided in communication with the conduit 31, being normally closed during operation of the brakes and provides means by which the air in the conduit 31 is replenished and made ready for the next operation.

In the wheel brakes illustrated in connection with Figure 1, the system has been shown and described as embodying individual or single cylinder wheel brake units for the wheels 26 and 27, which units are adapted to be actuated either by hydraulic pressure entering through the connections 24 and 25 or by pneumatic pressure entering through the connections 36 and 37, into the respective brake units. In this type of brake, which will be more fully described in connection with the diagrammatic showing in Figure 6, the shoes or pressure plates are alternately actuatable by two separate cylinders or diaphragms, one being under the influence of the hydraulic cylinder and the other being connected to the pneumatic portion of the system. Before the lowered diaphragm of the accumulator 30 can be again raised to its initial position, the line 28a is opened to provide an escape path for the liquid which has been trapped under pressure within the conduit 28 between the check valve 29 and the diaphragm of the accumulator 30. After the system has been pre-charged through the connection 31a the relief line 28a is again closed before the hydraulic system is again placed in operation. The present invention is, however, equally well adapted for use in systems having wheels provided with single brake units and the fluid connections for such a wheel 26, provided with a single braking unit 41, is shown in Figure 2. In such installations the hydraulic line 19 and the emergency pneumatic line 34 are interconnected adjacent the wheel brake unit to a shuttle valve 40 of a conventional type in which pressure from either line is permitted to enter the braking cylinder while closing off the other line which is inoperative, or does not contain fluid braking medium under pressure.

Figure 4:
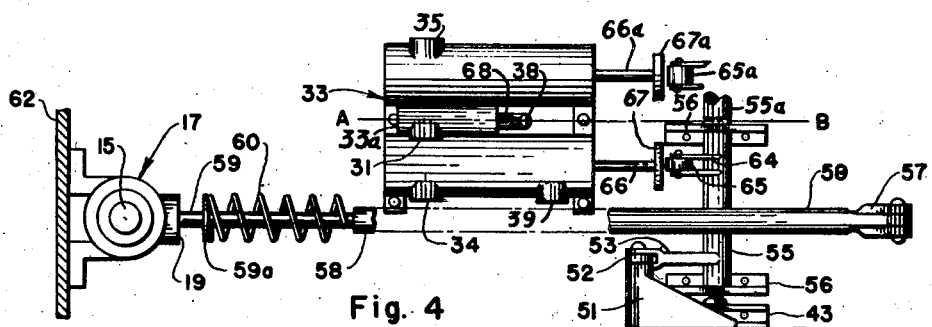
Figure 4 is a plan view of the actuating mechanism shown in Figure 3.
Figure 5:
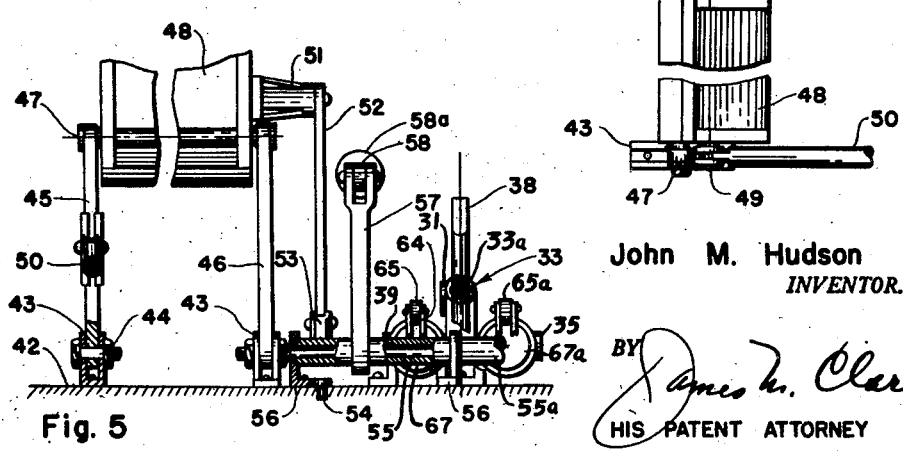
Figure 5 is an elevational view, partially broken away, showing the mechanism of Figures 3 and 4.

Referring now to Figures 3, 4 and 5, the numeral 42 indicates the surface of the floor of an aircraft cockpit or other vehicle upon which is mounted the bifurcated brackets 43 apertured to receive the pivot bolts 44 for the pivotal mounting of the levers or arms 45 and 46. The upper and outer ends of the arms 45 and 46 are apertured to receive the pivot 47 attaching the combined rudder and brake pedal 48 for joint and pivotal movements with respect to the supporting arms 45 and 46. It will be understood that the pedal 48 is capable of pivotal rotation about its pivot 47 into a position such as that indicated by the broken lines for braking control, and that the pedal is also capable of pivotation about the axis of the lower pivot bolt 44 (without any relative movement between the pedal 48 and its supporting arms 45 and 46) which conjoint movement obtains the desired control of the rudder surface. The latter function is obtained in a conventional and well known manner as by a pivotal connection 49 to the arm 45, connecting the same to the push-pull rod 50 which extends rearwardly and forms a part of the rudder control mechanism. The pedal 48 is provided with a integral arm portion 51 to which is pivotally connected the link 52 and it is through the movements of the arm 51 as the pedal 48 pivots about the axis of the pin 47 that the desired braking effects to be described are obtained. It will be also understood that Figures 3, 4 and 5 show but one half of the complete installation which is symmetrical about the axis A—B of Figure 4.

The lower end of the link 52 is pivotally connected to an arm 53 which is in turn pivotally mounted upon the extended axis of the pivot bolts 44. The arm 53 is provided with an extending abutment portion which is adapted to engage a limit stop 54 which in turn may be supported upon the floor structure 42 and serves to limit or restrict the forward depression of the pedal 48 in its rotation about the axis of its pivot 47. The arm 53 is preferably integral with or rigidly attached to a tubular shaft 55 which is journaled for rotation within the bearing brackets 56 supported upon the floor 42, such journalling being about the extended axis of the pivot bolts 44.

The tubular shaft 55 also has similarly attached thereto the upwardly and rearwardly extending lever 57 which has an outer bifurcated terminal pivotally attached to the push-tube 58 telescopically slidable over the push-rod 59. The telescoping of the tube 58 over the rod 59 is resiliently opposed by the compression spring 60 interposed between the abutment rings or washers 58a and 59a, fixedly attached to the tube 58 and the rod 59, respectively. The push-pull rod 59 is pivotally connected to the lower terminal of a bell crank 61 which is pivotally mounted upon the previously described hydraulic brake valve 17, for operative engagement with the plunger 63 thereof. For the purposes of the present description, this is the left valve in Figure 1, having a pressure inlet connection at 15, a brake cylinder connection at 19, and a connection for the return of hydraulic fluid through the port and conduit 21. The hydraulic power brake valve 17 is preferably attached to the transverse wall or instrument panel 62 and it will be understood that only one half of the operating mechanism is shown in Figures 3, 4 and 5 and that the second valve 18 would be adjacently disposed.

The tubular shaft 55 is also provided with a similarly attached pair of spaced arms forming a bifurcated lever 64 between which the roller 65 is pivotally mounted. This bifurcated lever 64 and its roller 65 extends upwardly and forwardly from the axis of the tubular shaft 55 toward the air emergency differential brake valve 33, which has a rearwardly extending piston or plunger 66 terminating in the transverse disc or plate 67, which is adapted to be engaged by the roller 65. Forward rocking of the shaft 55 in the counterclockwise direction as viewed in Figure 3 results in the roller 65 engaging the disc 67 and resulting forward movement of the plunger 66 into the body of the emergency air valve 33, in such manner that the air pressure entering through the line 31 to the valve 33 is controlled through the outlet 34 to the air brake cylinder of the same wheel 26 which is controlled by the flow through the line 19 from the corresponding hydraulic brake valve 17. The air emergency differential brake valve 33, as indicated above, is provided with a release lever 38 pivotally connected to the plunger 68 for conditioning the emergency air valve for use by allowing air from the accumulator 30 to enter both differential air brake valve chambers, of which the connection 34 is that which extends to the left wheel 26, and a similar connection on the opposite side of the valve, operable by the right rudder and brake pedal (not shown), is in communication with the conduit 35 for connection to the brake unit of the right wheel 27.

It will be understood from the foregoing description that the operating mechanism shown in Figures 3, 4 and 5, is that for the left wheel 26 only, being operated by the left foot of the pilot, or operator, by rocking of the rudder-brake pedal 48 either about the pivot axis 47 for brake control, or about the pivot axis 44 for rudder control. It will also be understood that a similar operating mechanism symmetrically disposed with respect to the longitudinal axis of symmetry A—B of the installation as indicated in Figure 4, will be provided on the far side, or right side, of the operating compartment for the similar control of the right wheel brake and operation of the rudder from that side of the vehicle by the right foot of the pilot.

In Figure 6 there is illustrated the two separate brake motors 69 and 73 for the wheel 26 which communicate, respectively, with the hydraulic line 24 and the pneumatic emergency line 36. The hydraulic motor 69 has its piston pivotally connected to the brake shoe 70 engageable, upon actuation, with the brake drum 72 and normally restrained from contact therewith by the tension spring 71. The pneumatic unit 73, in communication with the emergency air line 36, is similarly operatively connected to its brake shoe 74 and the like tension spring 75 normally restraining the same from engagement with the diagrammatically opposite interior surface of the brake drum 72. It will be understood that the opposite wheel 27 may also be similarly provided with two separate brake motors for actuation by the hydraulic pressure within the conduit 25, as well as the pneumatic pressure within the conduit 37.

The operation of the combined hydraulic and pneumatic system, and the mechanism for the manual actuation of the same is as follows:

With the pressure pump 11 in operation and the normal hydraulic portion of the system operating under the influence of the fluid pressure in the main supply line 12, 16 and 15, the simultaneous or differential control of the brakes of the wheels 26 and 27 is obtained by the operator's actuation of the left pedal 48 about its pivot 47 for the control of the hydraulic valve 17, and the corresponding braking of the wheel 26; and his operation of the similar pedal (which has not been shown) for the control of the valve 18 and the braking of the right wheel 27. The depression or rocking of the pedal 48 about its pivot 47 from the full line position in Figure 3 to the broken line position imparts downward movement of the link 52 due to rocking movement of the arm 51 of the pedal 48, and like rocking of the arm 53 about the axis of the tubular shaft 55. Rotation of the latter causes similar movement of the lever 57 and the push-pull rod combination 58—59 for upward movement of the plunger 63 within the valve 17 for control of the braking fluid to the cylinder unit within the left wheel 26. Inasmuch as the rocking of the pedal 48 about the axis of the pivot 47 does not impart rotational movement to the supporting arms 45 and 46 about their axis 44, the pivot 49 and the push-pull rod 50 remain in their neutral position, and no movement is imparted to the rudder control surface, or surfaces. Rocking of the tubular shaft 55, as the result of similar movement of the pedal 48, causes like movement of the bifurcated arm 64 and the attached roller 65, which causes translational movement of the plunger 66 through the roller contact with the disc 67, but inasmuch as the air emergency valve 33 has not been conditioned by rocking of the lever 38, the movement of the parts of the valve 33 has no effect upon the operation of the emergency pneumatic lines 34 and 35 under these conditions.

In the event of any emergency, however, the pneumatic line 31, which is in communication with air side of the emergency accumulator 30 has had air pressure developed therein by the application of the pre-charging air pressure through the line 31a to approximately the same pressure as that on the pump side of the accumulator. In the event of failure of any portion of the normal hydraulic system on the pump side of the check valve 29, this check valve is automatically closed and the pressure within the remaining fluid conduit portion 28 is substantially maintained. Upon movement of the emergency release lever 38 by the foot of the operator, or other simple single acting means, the air pressure within the conduit 31 is permitted to pass into the two-valve chambers of the air emergency brake valve 33; and this dual air valve is then in condition to perform for a limited time the functions which had previously been accomplished by the normal hydraulic brake valves 17 and 18. After the operator has conditioned the air brake valve 33 by operation of the lever 38, his continued operation of the rudder-brake pedals (of which 48 is that for his left foot), is continued precisely the same as when the wheels were being braked by the normal hydraulic system. With the dual air emergency valve 33 in operation, the movements of the roller 65 transmitted to the plunger 66 control the flow of emergency air to the left wheel 26 through the outlet 34, and similarly the movements of the right foot of the operator control the flow through the opposite outlet 35 to the other wheel 27. During the time that the air brake valve 33 is being operated, the lever 57 is also being moved together with its attached push-pull rod 58—59 and these movements are transmitted to the plunger 63 which causes the parts of the valve 17 to idle in view of the pressure failure on this side of the system. In the event either of the valves 17 or 18 have become jammed to the extent that the plunger 63 cannot be moved, the exertion of sufficient pedal forces by the operator will cause compacting of the spring 60 interposed between the push-rod parts 58 and 59 to a sufficient extent to permit adequate operation of the air emergency valve 33.

It will accordingly be seen that the dual hydraulic-pneumatic emergency system shown and described automatically provides for the emergency operation of a pair of wheels of a vehicle, or other like members. An important aspect of this emergency operation of such devices is the ability to differentially control these devices, which is particularly important in the case of aircraft wheel brakes, and the brakes of certain other vehicles. The ground handling and steering of many types of aircraft is accomplished to a great extent by the ability of the pilot to differentially brake the wheels, and in landing and take-off operation this differential braking feature can be of the utmost importance. Other emergency systems in the past have been provided but these have primarily been in the case of the systems adaptable only for the actuation of parts or other mechanism intended to occupy either one of two different positions and as such would not be of use in the control of such units as wheel brakes which must be actuated by varying and differential pressures. These prior emergency sources of pressure were most frequently obtained from air or $CO_2$ pressure bottles or flasks and when applied to the operating mechanism of any airplane they cause an uncontrolled pressure surge from the emergency line. If applied to brake systems, this would in turn cause the brakes to lock, and in certain instances catastrophic results might probably ensue. A further distinct advantage of the presently disclosed system is the ability of the pilot or operator to obtain this differential control by operation of the same normal brake pedals in precisely the same manner as for the hydraulic control.

Other forms and modifications of the present invention, both with respect to the general arrangement of the system and operating mechanism, as well as with respect to the details of its individual parts, are intended to come within the scope and spirit of the present invention as more particularly defined in the appended claims.

I claim:

1. Dual power supply means for an emergency brake system for use in conjunction with a normal hydraulic brake portion including a source of fluid pressure, a wheel brake unit and a hydraulic brake valve for the control of said fluid pressure from said pressure source to said wheel brake unit, the said emergency brake power supply means including an air brake valve having an outlet in communication with said wheel brake unit and accumulator means in communication with an inlet of said air brake valve for the creation of fluid pressure to said emergency air brake valve initiated by the action upon said accumulator means of the fluid pressure in said normal hydraulic portion of the system arranged for the emergency braking of the wheel by the manual operation of the air brake valve.

2. Power operating means for a normally hydraulic actuating system for a pair of differentially actuated wheel brake units including a source of fluid pressure, a pair of hydraulic power brake valves, a pair of wheel brake units, fluid conduit means operatively interconnecting said pressure source, said valves and said brake units, and an emergency power source including a hydraulic-pneumatic accumulator having its hydraulic side in communication with said normal pressure source for the development of pneumatic pressure on its other side, and pneumatic brake means in communication with said pneumatic pressure source and said wheel brake units arranged for the differential actuation thereof by manual operation of said pneumatic brake means.

3. Dual power operating means for an aircraft wheel brake system including a primary system of hydraulic fluid pressure, a main supply line for said fluid under pressure, a pair of hydraulic brake valves in communication with said main supply line, a pair of wheels each having a brake operatively associated therewith, means separately connecting said brake valve with its respective wheel brake unit whereby said wheel brakes may be differentially controlled, and a secondary source of power including accumulator means in communication with said fluid pressure in said main supply line, a dual emergency valve having separate connections to the respective wheel brake units and means for the communication of pressures developed in said accumulator means from said main supply line to said dual emergency valve for the differential actuation of said wheel brake units by the manual operation of said dual emergency valve.

4. Dual power supply means for a brake system including a normal source of hydraulic fluid pressure, a main supply line for said fluid under pressure, a hydraulic brake valve in communication with said source of fluid pressure within said main supply line, a wheel brake unit, conduit means interconnecting said hydraulic brake valve with said wheel brake unit for the control thereof by actuation of said hydraulic brake valve, communicating means extending from said hydraulic valve for the return of fluid to said source of fluid pressure, and an emergency source of air power including hydraulic-pneumatic accumulator means in fluid communication with said main supply line, an emergency air brake valve, conduit means connecting said accumulator means with said emergency air brake valve whereby hydraulic pressures applied to said accumulator means from said main supply line develop pneumatic pressures within said conduit means for their supply to said emergency air brake valve, and conduit means interconnecting said emergency air brake valve with said wheel brake unit for the emergency actuation thereof by manual operation of said air brake valve.

5. A dual air-hydraulic wheel brake system for aircraft including a fluid receiver, a fluid pump in communication with said receiver, a main pressure supply line in communication with said pump, a brake valve having an inlet in communication with said main supply line, a wheel brake unit, conduit means interconnecting said brake valve with said wheel brake unit, conduit means for the return of fluid to said source of fluid pressure, an emergency source of air pressure including an accumulator having a first chamber in communication with the fluid under pressure in said main supply line, an emergency air brake valve, conduit means interconnecting the remaining chamber of said accumulator with said emergency air brake valve whereby pressures developed within said accumulator by hydraulic pressures in said main supply line become available at said emergency air brake valve, and conduit means interconnecting said emergency air brake valve with said wheel brake unit whereby the latter can be manually operated when the normal hydraulic portion of said system is inoperative.

6. Dual power operating means for an aircraft brake system including a pair of fluid pressure responsive wheel brake units, a primary source of fluid pressure for supplying operating fluid to said wheel brake units, a main supply line from the source of said fluid pressure, a pedal-operated brake valve for each of said wheel brake units, conduit means connecting each said brake valve with said main supply line, further conduit means connecting the respective brake valves with their corresponding wheel brake units whereby differential actuation of said brake valves causes differential braking of said wheel brake units, return conduit means interconnecting said brake valves with said fluid pressure source, and a secondary source of power including an air-hydraulic accumulator having one of its two chambers in communication with said main supply line, a check valve disposed between said accumulator and said main supply line to prevent return flow from said accumulator from passing into said main supply line upon lowering of the pressure therein, and emergency means in fluid communication with the remaining chamber of said accumulator for operating on the pressure developed by the hydraulic pressure in the first said chamber of said accumulator for the emergency differential actuation of said wheel brake units by the manual operation of said emergency means when the normal hydraulic portion of said system may otherwise be inoperative.

7. Dual power supply means for an aircraft wheel brake system, including a primary source of fluid pressure, primary brake valves, wheel brake means, conduit means operatively communicating with said pressure source, said brake valves and said wheel brake means arranged for the normal operation of said wheel brake means upon manual actuation of said primary brake valves, an accumulator, communicating means between said accumulator and said pressure source, air brake valves, and conduit means interconnecting said air brake valves with said accumulator and said wheel brake means arranged to provide a secondary power source for the emergency operation of said wheel brake means by the manual actuation of said air brake valves.

8. Dual power supply means for an aircraft wheel brake system, including a primary source of fluid pressure, primary brake valves, wheel brake means, conduit means operatively communicating with said pressure source, said brake valves and said wheel brake means arranged for the normal operation of said wheel brake means upon manual actuation of said primary brake valves, a dual chambered accumulator, communicating means between a first chamber of said accumulator and said pressure source, air brake valves, mechanism operatively interconnecting said primary and air brake valves, and conduit means interconnecting said air brake valves with the second chamber of said accumulator and said wheel brake means arranged to provide a secondary power source for the emergency operation of said wheel brake means by the manual actuation of said mechanism and said air brake valves.

9. Dual power supply means for an aircraft wheel brake system, including a primary source of fluid pressure, primary brake valves, pedal means operatively associated with said wheel brake means, conduit means operatively communicating with said pressure source, said brake valves and said wheel brake means arranged for the simultaneous and differential normal operation of said wheel brake means upon manual actuation of said pedal means for said primary brake valves, an accumulator, communicating means between said accumulator and said pressure source, air brake valves, mechanism operatively interconnecting said pedal means with said air brake valves, and conduit means interconnecting said air brake valves with said accumulator and said wheel brake means arranged to provide a secondary power source for the simultaneous and differential emergency operation of said wheel brake means by the manual actuation of said pedal means.

10. Dual power supply means for an aircraft wheel brake system including a primary source of fluid pressure, primary brake valves, pedal means operatively associated with said wheel brake means, conduit means operatively communicating with said pressure source, said brake valves and said wheel brake means arranged for the simultaneous and differential normal operation of said wheel brake means upon manual actuation of said pedal means for said primary brake valves, an accumulator, communicating means between said accumulator and said pressure source, air brake valves, mechanism operatively interconnecting said pedal means with said air brake valves, conduit means interconnecting said air brake valves with said accumulator and said wheel brake means arranged to provide a secondary power source for the simultaneous and differential emergency operation of said wheel brake means by the manual actuation of said pedal means, and valve means for cutting-off said secondary power source to said air brake valves when said wheel brake means are operated normally through said primary brake valves.

11. Dual power supply means for an aircraft wheel brake system including a primary source of fluid pressure, primary brake valves, pedal means operatively associated with said wheel brake means, conduit means operatively communicating with said pressure source, said brake valves and said wheel brake means arranged for the simultaneous and differential normal operation of said wheel brake means upon manual actuation of said pedal means for said primary brake valves, a dual chambered accumulator, communicating means between a first chamber of said accumulator and said pressure source, a check valve within said communicating means to prevent return flow from said accumulator, air brake valves, mechanism operatively interconnecting said pedal means with said air brake valves, conduit means interconnecting said air brake valves with the second chamber of said accumulator and said wheel brake means arranged to provide a secondary power source for the simultaneous and differential emergency operation of said wheel brake means by the manual actuation of said pedal means, and valve means for cutting-off said secondary power source to said air brake valves when said wheel brake means are operated normally by said pedal means.

JOHN M. HUDSON.

REFERENCES CITED

The following references are of record in the file of this patent:

UNITED STATES PATENTS

| Number | Name | Date |
|---|---|---|
| 2,244,317 | Rockwell | June 3, 1941 |
| 2,305,759 | Berger | Dec. 22, 1942 |